United States Patent [19]

Cook et al.

[11] 4,336,440

[45] Jun. 22, 1982

[54] WELD TRACKING/ELECTRONIC ARC SENSING SYSTEM

[75] Inventors: George E. Cook, Brentwood; George J. Merrick, Franklin, both of Tenn.; Urban A. Schneider, St. Petersburg; Willibald R. Rosenberger, Pensacola, both of Fla.

[73] Assignee: Westinghouse Electric Corp., Pittsburgh, Pa.

[21] Appl. No.: 54,517

[22] Filed: Jul. 3, 1979

[51] Int. Cl.³ .............................................. B23K 9/10
[52] U.S. Cl. .......................... 219/124.34; 219/125.12
[58] Field of Search .......... 219/124.34, 124.1, 124.22, 219/124.03, 125.12; 266/67

[56] References Cited

U.S. PATENT DOCUMENTS

| | | | |
|---|---|---|---|
| 2,082,967 | 6/1937 | McKiernan | 266/67 |
| 3,646,309 | 2/1972 | Smith, Jr. et al. | 219/124.34 |
| 4,095,077 | 6/1978 | Schneider et al. | 219/125.12 |
| 4,151,395 | 4/1979 | Kushner et al. | 219/124.34 |
| 4,188,525 | 2/1980 | Merrick et al. | 219/125.12 |

FOREIGN PATENT DOCUMENTS 2645788 4/1978 Fed. Rep. of Germany ....................... 219/125.12

OTHER PUBLICATIONS

ESAB Publication, "Joint Tracking Unit AG-GAA", 12/1/1977.

*Primary Examiner*—G. C. Shaw
*Attorney, Agent, or Firm*—Daniel C. Abeles

[57] ABSTRACT

Apparatus for tracking a welding electrode (22) within a weld groove (12). As the welding arc struck between the electrode (22) and the workpiece (16) is oscillated laterally (14) within the groove means (28 and 30) are provided for supplying an indication of both the voltage drop between the electrode and the side wall of the groove as the arc approaches the side wall, and the width of the excursion of the arc from the center of oscillation to the point where the voltage is measured. The center of oscillation is then adjusted as a function of the measured width and voltage.

2 Claims, 2 Drawing Figures

WELD TRACKING/ELECTRONIC ARC SENSING SYSTEM

BACKGROUND OF THE INVENTION

The invention pertains generally to welding electrode tracking systems and more particularly to such systems that employ a substantially constant arc transfer current, either pulsed or sustained.

For many arc welding applications it is impractical to implement the welding torch support and drive mechanism such that the torch is always moved in a path exactly parallel to the weld joint centerline. In such cases it is necessary to use some type of weld joint tracking system. The tracking system senses the position of the welding torch or arc relative to the weld joint and uses this information in a feedback manner to reposition the torch relative to the weld joint as necessary to maintain the weld torch at a preselected orientation to the weld joint. Methods of sensing the torch position that have been previously used include: (1) visual inspection; (2) contacting electromechanical probes; and (3) non-contacting transducers. Each of these methods has met with varying degrees of success, depending primarily on the weld joint geometry and the arc visibility. Recent developments in narrow groove welding, however, have pointed to the need for sensing the position of the torch and arc relative to the narrow groove joint by a means that does not depend on any of the previously used methods. This uniqueness of the narrow groove welding requirement arises from its inherent poor arc visibility and extreme sensitivity to torch positioning.

SUMMARY OF THE INVENTION

Briefly, this invention provides an improved welding electrode tracking system which does not impair the visibility of the weld groove with sensors and is responsive, with a minimum of lag time, to reposition the welding electrode when it departs from a prescribed, programmed orientation with the weld groove.

The improved welding tracking system of this invention includes means (30) for oscillating the arc struck between the welding electrode (22) and the workpiece (16) laterally within the weld groove (12) and providing an electrical output representative of the width of oscillation of the arc from a pre-established null (i.e. center of oscillation) position. Means (28) are provided for monitoring the voltage drop between the welding electrode and a side wall of the weld groove when the welding arc is extended a given distance towards the wall. Means (34 and 36) are further provided for automatically adjusting the preestablished null as a function of the magnitude of the monitored voltage drop between the electrode and the weld groove side wall and the given width of oscillation at which the voltage is measured to maintain the null position at a preselected position along the lateral line of oscillation.

In one preferred embodiment the electrode is maintained substantially at a preselected distance from the bottom of the weld groove when the electrode is located at a given position relative to the side wall of the weld groove. As the arc is laterally extended towards each of the side walls of the groove, alternately, the voltage is measured at the lateral extensions of oscillation. The voltage at each side wall is then compared and the difference employed to re-establish the null position in a manner to minimize the difference in measured voltages between the side walls. Desirably, the electrode is maintained at its preselected distance from the bottom of the weld groove by an arc voltage control system (32) which, in one embodiment, monitors the voltage between the electrode and the bottom of the weld groove alternately with the voltage measurements taken at the side walls.

In an another embodiment means (30) are provided for oscillating the arc to a lateral extremum on either side of a predetermined null; where the extremum is determined by a reversing means (34) which reverses the lateral movement of the arc upon an indication of a pre-established electrode-to-side wall monitored voltage drop. The width of each excursion from the null is monitored and the electrode or arc is adjusted to maintain the null at a pre-established position along the path of lateral oscillation.

BRIEF DESCRIPTION OF THE DRAWINGS

For better understanding of the invention, reference may be had to the preferred embodiment, exemplary of the invention, shown in the accompanying drawings in which.

DESCRIPTION OF THE PREFERRED EMBODIMENT

Figure 1:
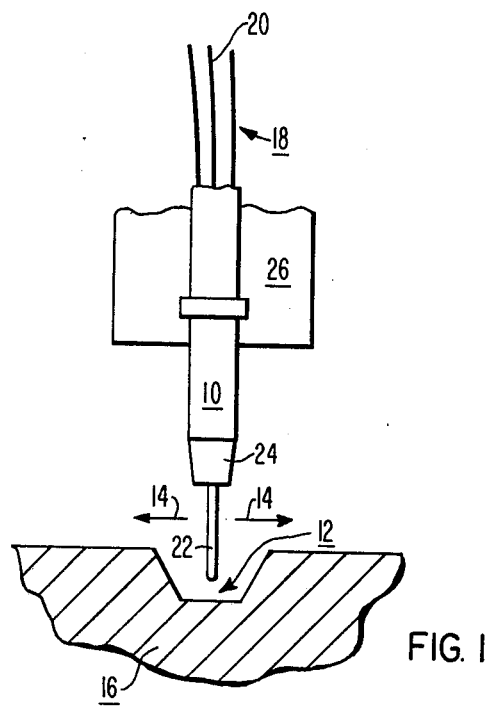
FIG. 1 is a schematic perspective of a welding torch assembly which can be employed with this invention.

This invention provides an improved weld groove tracking system for programmably maintaining the position of a welding electrode and arc within a weld groove as the electrode traverses the longitudinal dimension of the groove. In the preferred embodiment, which can be appreciated by reference to FIG. 1, the arc struck between the welding electrode 10 and the workpiece 16 is oscillated within a weld groove 12 in a direction 14 traverse to the longitudinal dimension of the weld groove. The arc voltage between the electrode (the edge of the plasma cone, for example) and the side wall at the extremities of oscillation are measured. The width of oscillation from a pre-established null at which the side wall voltages are measured is also monitored. The null reference for oscillation can then be maintained at any predetermined location along the oscillation path by adjusting the null as a function of the magnitude of the voltage drop between the electrode and the weld groove side wall and the given width of oscillation at which the voltage is measured. A preferred embodiment of this invention is described more specifically hereafter as applied to gas-tungsten arc welding apparatus employing an oscillating arc arrangement; though it should be appreciated the invention can be applied to welding apparatus employed with other welding processes so long as the side wall measurements generated in accordance with this invention are compared with a common relative reference value.

In the gas-tungsten arc process a plasma arc is struck between a tungsten electrode 22 and the workpiece 16, which is normally grounded. Desirably, the weld puddle in the bottom of the weld groove is purged of air by a stream of inert gas, for example a mixture of argon and helium, which is directed from the torch 10 by and through the nozzle 24. The purging gas forms an inert barrier to prevent impurities from being absorbed into the weld metal as it solidifies. The weld material is added to the puddle through a separate wire feed system, which is not shown. In some applications it is desirable to cool the torch, and generally water conduits within the torch are employed for this purpose. The cabling for supplying the electricity, water and gas to the torch is figuratively illustrated by reference character 18. It should be appreciated that in some applications the separate water, gas and electrical conduits are provided by concentric passages in the cabling.

It is known in the art that in some applications it is desirable to oscillate the arc struck between the torch and the workpiece, laterally within the groove, as indicated by the directional arrows 14, to spread the weldment across the width of the groove and achieve an integral alloying with the side walls of the weld joint. The tungsten torch 10 is shown coupled to a support bracket 26, which can be reciprocally driven in such a fashion by any one of several commercially available oscillators, which are normally employed for this purpose. Other forms of arc oscillation (whether or not implemented through oscillation of the torch) presently used in the art can be similarly employed for this purpose. For example, in a narrow groove where the width of oscillation is restricted it may be desirable to use a pivoting oscillator employing a torch support fixture similar to that described in U.S. Pat. No. 2,082,967, issued June 8, 1937. Such a fixture can be oscillated by a stepping motor and the oscillation excursion measurements made in a manner similar to that described in the following embodiment.

In addition, it is known that it is desirable to keep the tip of the tungsten electrode 22 at preselected distance away from the bottom of the weld groove 12. Automatic voltage control systems are commercially available for this purpose and are generally coupled to the fixture 26 to regulate the distance between the torch and the bottom of the weld groove. A sophisticated tungsten inert gas welding system describing the automatic voltage control and the other elements of the torch and fixturing assembly heretofore noted is described in U.S. Pat. No. 4,095,077 issued June 13, 1978.

The automatic voltage control system 32 basically monitors the voltage between the tungsten electrode 22 and the bottom of the weld groove 12 and compares that voltage with a preselected voltage. The difference indicated by the comparison is used as an error signal to drive a stepping motor connected to the fixturing 26 to reposition the torch with respect to the bottom of the weld groove in a direction to minimize the error. Thus, the arc voltage to the bottom of the weld groove is monitored and any deviation from the set point is employed to correct the spacing between the electrode and the bottom of the weld groove. Normally, automatic voltage control system 32 operation is inactivated during oscillator action to avoid erroneous readings encountered as the arc traverses the weld groove to the side wall of the lateral extensions of oscillation. Desirably, the welding electrode is driven from a constant current source so that voltage fluctuations are not erroneously noted by the automatic voltage control system (32) during its operation. Constant current control is also desirable to assure the integrity of the weldment.

In the preferred embodiment of this invention oscillation of the welding arc is accomplished by lateral displacement of the torch, as the torch traverses the weld groove, by a cross slide manipulator driven by a stepping motor. Oscillators of this type specifically designed for welding applications are commercially available. Desirably, the forward travel of the torch within the weld groove is maintained at a constant rate. In one embodiment the oscillator is controlled to move the torch K-1 steps to the right with the automatic voltage control operative for the first K-2 steps; where K-2 is less than K-1; and where the spacing between the tungsten and the bottom of the weld groove is less than the spacing between the tungsten and the side wall of the weld groove at the K-2 lateral displacement; and further where the spacing between the tungsten and the bottom of the weld groove is greater than the spacing between the tungsten and the side wall of the weld groove at the K-1 lateral displacement. After completing the K-1 steps the arc voltage is sampled a selected multiple number of times, for example eight times, with the automatic voltage control disconnected. The voltage reading is supplied by a voltage monitoring circuit 28 coupled between the tungsten electrode electrical connection to the torch 20 and ground. The multiple voltage samples are inputted to a microcomputer 34 via an analog-to-digital converter. The multiple samples of arc voltage are averaged in the microcomputer, and the result is stored in the memory; the torch is then moved left K-1 steps back to its original lateral position with the automatic voltage control operative in the last K-2 steps, and then K-1 steps further to the left with the automatic voltage control again operative in the first K-2 steps. After completing the last K-1 steps to the left, the arc voltage is again sampled a multiple number of times and the average is computed in the microcomputer. The torch is next moved K-1 steps to the right returning to its original null position. The automatic voltage control is again operative in the last K-2 steps. Simultaneously with the last operation the microcomputer compares the two average arc voltage samples. If the averaged voltage on the right excursion is less than that on the left excursion, the torch is moved K-3 steps to the left, where K-3 is a predetermined number, desirably traversing a small increment. If the average voltage on the right excursion is more than that on the left excursion, the torch is moved K-3 steps to the right. If the two voltages are equal, no correction to lateral travel is made. The process is then again repeated to provide continued accurate positioning of the weld torch within the groove as the torch traverses the weld seam. The accuracy of the voltage measurements can be enhanced by having the microcomputer disregard measurements outside of an anticipated range in computing the averages called for by this invention. A number of such noise rejection techniques are known in the art.

Figure 2:
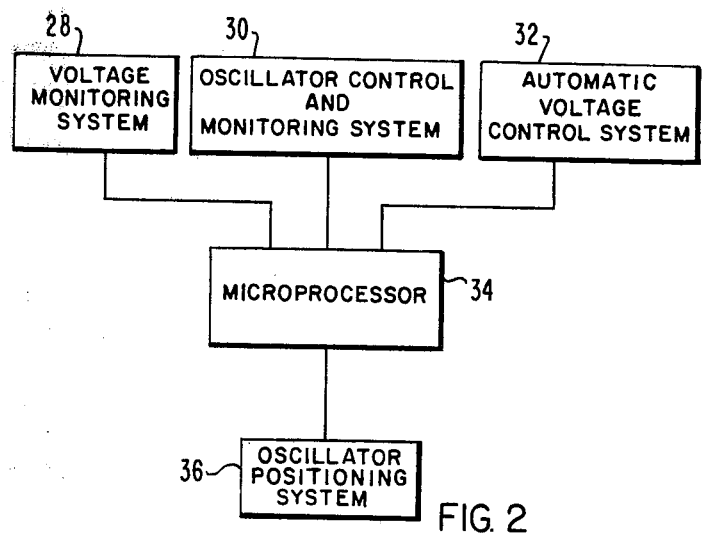
FIG. 2 is an electrical block diagram illustrative of the control arrangement of this invention.

It should be appreciated that the voltage monitoring circuit 28 can be employed for both the automatic voltage control system and the weld tracking system of this invention, so long as the automatic voltage control positioning system is disconnected during those portions of the lateral excursions of oscillation where the plasma shifts from the bottom of the weld groove to the side wall, to avoid erroneous measurements. Similarly, the lateral repositioning operations of this invention should be disabled during the periods of automatic voltage control monitoring. Block diagram 30 in FIG. 2 figuratively represents the oscillator control and monitoring system that provides an output indicative of the width of the lateral excursion of the oscillator. This output, representative of the oscillation width of the torch from a pre-established reference null, is communicated to the microprocessor 34 which connects and disconnects the automatic voltage control (32) stepping motor and lateral manipulator controls during the appropriate portions of the oscillation cycle. The microprocessor 34 also provides appropriate output commands to control the arc voltage control positioning system, the width of oscillation and the oscillation null position.

The lateral correction provided by the tracking system of the invention could also be made proportional to the difference in the two averaged side wall voltages rather than being a fixed number of steps K-3. In this instance, the microprocessor would provide an output proportional to the difference to direct the stepping motor to move an appropriate number of steps. A separate stepping motor 36 is figuratively illustrated for accomplishing the lateral displacement of the oscillator manipulator fixture for repositioning the null of oscillation. It should be further appreciated that the stepping oscillator can be replaced with a continuous oscillator with the width of oscillation monitored through an encoder output. Furthermore, in accordance with another embodiment of this invention the automatic voltage control can be inactivated during the lateral search mode, with periods of oscillation alternated with a normal travel mode without oscillation with the automatic voltage control operative; or a dwell period can be programmed between oscillations to accommodate the automatic voltage control operation.

An alternate embodiment can be employed in accordance with this invention wherein the arc is programmed to move or step laterally during oscillation until the side wall is sensed by the abrupt change in voltage experienced when the arc shifts to the weld groove side wall. The microprocessor can then determine the number of steps taken in each direction of lateral displacement of oscillation before the change in voltage is sensed, compare the number of steps taken on either side of the null of oscillation and make the appropriate correction to the lateral displacement to locate the welding electrode at a programmed position within the weld groove.

In a number of applications, especially where the weld is being accomplished in a narrow groove, during the initial weld passes, it is desirable to keep the arc centered in the weld groove. In such instances, the null would be programmably situated along the centerline of the groove. However, in other instances it is desirable to offset the arc. This can be accomplished with this invention by programming the null position to be located at a predetermined offset from the center of the groove. For example, where the oscillator laterally displaces the torch a predetermined number of steps on either side of the oscillation null and the voltage is measured at each excursion, a preselected offset can be added or subtracted from either measured voltage, or to the result of the comparison of voltages; or, alternately, where the voltage measured determines the width of oscillation in each direction, a preselected offset can be added to the comparison of the lateral excursion widths. Furthermore, it may be desirable in some applications to oscillate on one side of the groove only. In such a case a reference measurement can be taken and either the measured voltage or the width of oscillation (measured on the side of the groove within which the oscillation is implemented), whichever embodiment is used, can be compared to the reference to determine whether the arc should be repositioned. The single sidewall sensing mode operates in the same manner as described above except that all samples are taken either on the right extremity of oscillation or the left extremity of oscillation, but not both. For example: suppose the sampes are taken on the left extremity. Then successive averaged samples on the left extremity are compared for corrective action rather than samples at the left and right extremity. This means that samples are taken once per cycle of oscillation (on the left side) rather than twice per cycle of oscillation (on left and right sides). With this mode of operation you can track one side of the joint. This mode is also preferble for fillet welds (for example) formed by butting one member against another at right angles. Single sidewall sensing may be employed as an alternate tracking method during full width oscillation as well.

The tracking systems of this invention are thus extremely flexible and amenable to programmed operation, in that a number of references can be stored in the microprocessor and applied at varying points during a given pass, or between passes. It should be appreciated that the flexibility of the system of this invention will enable an operator to manually control the torch positioning and oscillating parameters until an optimum weld puddle is established. Then the operator can continue the welding pass, or implement subsequent passes under the established optimum operating conditions, automatically, through the programmed closed loop operation of this invention.

In accordance with this invention a further improvement is provided by monitoring the voltage between the welding electrode and the bottom of the weld groove over a plurality of oscillations, for example eight, and averaging the monitored voltage samples prior to being compared to the reference to establish whether any correction is required by the automatic voltage control system. Thus, the arc voltage is monitored each oscillation cycle, however, correction is only applied after a plurality of such cycles. The automatic voltage control spacing correction is made only during the period of the oscillation cycle that the automatic voltage control voltage monitoring is performed so that the movement into or away from the weld groove caused by the automatic voltage control does not affect the side wall voltage readings.

The oscillation variables and monitored parameters controlled by this invention can also be processed by a hard wired circuit arrangement similar to the circuit illustrated in FIG. 5 of U.S. patent application Ser. No. 522,190, filed Nov. 8, 1974, where the economics of microprocessor prove not to be feasible. The foregoing circuit is capable of averaging and storing the monitored values as required by this invention and can be used in connection with comparators and interface circuitry to provide the necessary outputs to control the various operations of this invention.

It should be further appreciated that it is desirable to employ a constant current during the periods that the comparative measurements are made in accordance with this invention so that the comparison can be effected with respect to a common reference. Other constraints on current, for example during the non-measurement periods, will depend upon the welding process employed.

Accordingly, this invention provides an improved weld tracking/arc voltage system that enables programmed precise positioning of the welding electrode within the groove as the electrode traverses the weld seam without the necessity for external sensors. While the system of this invention provides particular benefits in narrow groove welding applications, as noted previously, the invention will also enhance welding procedures applied to other groove geometries since the increase in tracking accuracy provided by this invention can increase the integrity of the weld.

What is claimed is:

1. A welding electrode tracking system for tracking a welding electrode within a weld groove comprising:
   means for oscillating the arc struck between the welding electrode and the workpiece, laterally within the weld groove;
   means for providing an indication representative of the width of oscillation of the arc from a pre-established null;
   means for providing an electrical output representative of the voltage drop between the welding electrode and a side wall of the weld groove when the welding arc is extended by its oscillating means a given distance towards the weld groove side wall;
   means for automatically adjusting the pre-established null as a function of the magnitude of the voltage drop between the electrode and the weld groove side wall and the given width of oscillation at which the voltage is measured to maintain the null at a preselected position along the lateral line of oscillation;
   a constant current source for exciting the welding electrode; and
   an automatic arc voltage system for automatically spacing the electrode a prearranged distance from the bottom of the weld groove wherein the automatic arc voltage control system is inoperable when the oscillating means extends the welding arc from the null a distance equal to or greater than the given distance and wherein the automatic voltage control system measures the voltage between the welding electrode and the bottom of the weld groove for each of a plurality of cycles of oscillation during that portion of the oscillation path for which it is operative; averages the voltages measured between the electrode and the bottom of the weld groove over a preselected number of cycles of oscillation; compares the measured voltage with a preselected setpoint corresponding to the prearranged distance; and is responsive to an indication of a difference in the average measured voltage and the setpoint to adjust the spacing between the electrode and the bottom of the weld groove to substantially nullify the difference.

2. A welding electrode tracking system for tracking a welding electrode within a weld groove comprising:
   means for oscillating the arc struck between the welding electrode and the workpiece, laterally within the weld groove;
   means for providing an indication representative of the width of oscillation of the arc from a pre-established null;
   means for providing an electrical output representative of the voltage drop between the welding electrode and a side wall of the weld groove when the welding arc is extended by its oscillating means a given distance towards the weld groove side wall;
   means for automatically adjusting the pre-established null as a function of the magnitude of the voltage drop between the electrode and the weld groove side wall and the given width of oscillation at which the voltage is measured to maintain the null at a preselected position along the lateral line of oscillation;
   means for reversing the lateral movement of the oscillating means in response to a preselected output from the side wall voltage measuring means; and
   wherein the adjusting means compares the width of oscillation with a given width and readjusts the null as a function of the difference between the indicated width of oscillation and the given width.

* * * * *